(12) United States Patent
Kim et al.

(10) Patent No.: US 11,495,989 B2
(45) Date of Patent: Nov. 8, 2022

(54) OUTPUT CONTROL METHOD OF PARALLEL BATTERY ENERGY STORAGE DEVICE INCLUDING INVERTER

(71) Applicant: HanJungNCS. Co., Ltd., Yeongcheon-si (KR)

(72) Inventors: Hwan-Sik Kim, Yeongcheon-si (KR); Hwan-Seob Kim, Daegu (KR); Hyung-Kyun Shin, Gyeongsan-si (KR); Pill-Soo Kang, Daegu (KR); Sung-Hun Kim, Gyeongsan-si (KR)

(73) Assignee: HanJungNCS. Co., Ltd., Yeongcheon-si (KR)

( * ) Notice: Subject to any disclaimer, the term of this patent is extended or adjusted under 35 U.S.C. 154(b) by 30 days.

(21) Appl. No.: 17/162,396

(22) Filed: Jan. 29, 2021

(65) Prior Publication Data
US 2022/0209569 A1    Jun. 30, 2022

(30) Foreign Application Priority Data

Dec. 24, 2020  (KR) .......................... 10-2020-0182968
Jan. 14, 2021  (KR) .......................... 10-2021-0005053

(51) Int. Cl.
*H02J 7/34*   (2006.01)
*H02J 7/00*   (2006.01)

(52) U.S. Cl.
CPC .............. *H02J 7/34* (2013.01); *H02J 7/0047* (2013.01); *H02J 2207/20* (2020.01)

(58) Field of Classification Search
CPC ........................................................ H02J 7/00
See application file for complete search history.

(56) References Cited

U.S. PATENT DOCUMENTS

2019/0067989 A1*  2/2019  Beg .......................... H02J 3/388

* cited by examiner

*Primary Examiner* — Robert Grant
(74) *Attorney, Agent, or Firm* — Sughrue Mion, PLLC (57) ABSTRACT

Provided is an output control method of a parallel battery energy storage device including an inverter. More particularly, the present disclosure relates to an output control method, wherein when an external battery is connected in parallel to an inverter equipped with an internal battery and is used, output power is limited depending on a capacity of the external battery, thereby ensuring user safety.

4 Claims, 6 Drawing Sheets

OUTPUT CONTROL METHOD OF PARALLEL BATTERY ENERGY STORAGE DEVICE INCLUDING INVERTER

CROSS REFERENCE TO RELATED APPLICATION

The present application claims priority to Korean Patent Applications No. 10-2020-0182968, filed Dec. 24, 2020, and No. 10-2021-0005053, filed Jan. 14, 2021, the entire contents of which is incorporated herein for all purposes by this reference.

BACKGROUND OF THE INVENTION

Field of the Invention

Provided is an output control method of a parallel battery energy storage device including an inverter. More particularly, the present disclosure relates to an output control method, wherein when an external battery is connected in parallel to an inverter equipped with an internal battery and is used, output power is limited depending on a capacity of the external battery, thereby ensuring user safety.

Description of the Related Art

Currently, a portable battery system generally used in ships, outdoor stages, and camping sides has a structure in the shape of a box, and supplies power to electronics by applying a power socket to terminal (+) and terminal (−).

However, the portable battery system in the related art always outputs only fixed 5 V and 12V, so it is necessary to install a DC-DC converter or AC-DC converter separately. Further, the conventional portable battery system has fixed output power, so it is applicable only to particular electronics and thus the range of use is narrow.

In addition, in the case of long-term use, when the battery is used up by the number of times that charging and discharging are performed and by the charge capacity of the battery, the conventional portable battery system is altogether discarded without replacing the used-up battery with other rechargeable batteries, which is a terrible waste of resources and a main culprit causing environmental pollution.

In order to increase battery capacity of a battery system that has been used in the related art, in the case of expansion in parallel with a sub-battery pack, the voltage of the main battery pack in use always varies and the voltage of the sub-battery pack to be connected is fixed, so there is a difference in voltage between the two packs. In addition, regarding the battery system that has been used in the related art, in order to prevent excessive current that is likely to occur because of the difference in voltage, a person charges or discharges the sub-battery pack manually to make the voltages similar and is then able to install and connect the sub-battery pack.

The foregoing is intended merely to aid in the understanding of the background of the present disclosure, and is not intended to mean that the present disclosure falls within the purview of the related art that is already known to those skilled in the art.

Document of Related Art (Patent Document 1) Korean Patent No. 10-0836047

SUMMARY OF THE INVENTION

Accordingly, the present disclosure has been made keeping in mind the above problems occurring in the related art, and the present disclosure is intended to ensure user safety, wherein when an external battery is connected in parallel to an inverter equipped with an internal battery and is used, output power is limited by controlling current or voltage depending on a capacity of the external battery.

According to an embodiment of the present disclosure, there is provided an output control method of a parallel battery energy storage device including an inverter, the output control method including: turning on power of the energy storage device; detecting connection of an external battery to the inverter by detecting a voltage of the external battery at a detection step; measuring a current of the inverter at a current measurement step; and comparing an output power of the inverter with a predetermined power P1 at a first power comparison step, wherein at the first power comparison step, when the output power of the inverter exceeds the predetermined power, connection of the external battery is disconnected and an internal battery is applied as a mainly used battery.

At the first power comparison step, when the output power of the inverter is equal to or less than the predetermined power, power of the inverter may be turned on.

After connection of the external battery is disconnected and the internal battery is applied as the mainly used battery, the method may further include comparing the output power of the inverter with a predetermined power P2 at a second power comparison step.

At the second power comparison step, when the output power of the inverter exceeds the predetermined power P2, connection of the internal battery may be disconnected and a notification signal may be provided to a user.

At the second power comparison step, when the output power of the inverter is equal to or less than the predetermined power P2, power of the inverter may be turned on.

According to an embodiment of the present disclosure, there is provided an output control method of a parallel battery energy storage device including an inverter, the output control method including: turning on power of the energy storage device; detecting connection of an external battery to the inverter by detecting a voltage of the external battery at a detection step; measuring the voltage of the external battery at a voltage measurement step; measuring a current of the inverter at a current measurement step; and comparing an output power of the inverter with a reference correction value P3 at a correction value comparison step, the reference correction value depending on the voltage of the external battery, wherein at the correction value comparison step, when the output power of the inverter exceeds the reference correction value, connection of the external battery is disconnected and a notification signal is provided to a user.

At the correction value comparison step, when the output power of the inverter is equal to or less than the reference correction value, power of the inverter may be turned on.

According to the present disclosure, when the external battery is connected in parallel to the inverter equipped with the internal battery and is used, output power is limited depending on a capacity of the external battery, thereby ensuring user safety.

In addition, output is limited depending on a particular environment of the external battery, so that battery life and durability can be protected.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The above-described features and effects of the present disclosure will be more clearly understood from the following detailed description with reference to the accompanying drawings. Accordingly, those skilled in the art to which the present disclosure pertains can easily embody the technical idea of the present disclosure. The present disclosure may be modified in various ways and implemented by various embodiments, so that exemplary embodiments are shown in the drawings and will be described in detail. However, there is no intent to limit the present disclosure, and it is to be understood that the exemplary embodiments include all modifications, equivalents, or substitutes in the idea and the technical scope of the present disclosure. The terms used in the present application are merely used to describe the embodiments, and are not intended to limit the present disclosure.

Hereinafter, exemplary embodiments of the present disclosure will be described in detail with reference to the accompanying drawings.

The present disclosure relates to an output control method of a parallel battery energy storage device including an inverter. More particularly, the present disclosure relates to an output control method, wherein when an external battery is connected in parallel to an inverter equipped with an internal battery and is used, output power is limited depending on a capacity of the external battery, thereby ensuring user safety.

Figure 1:
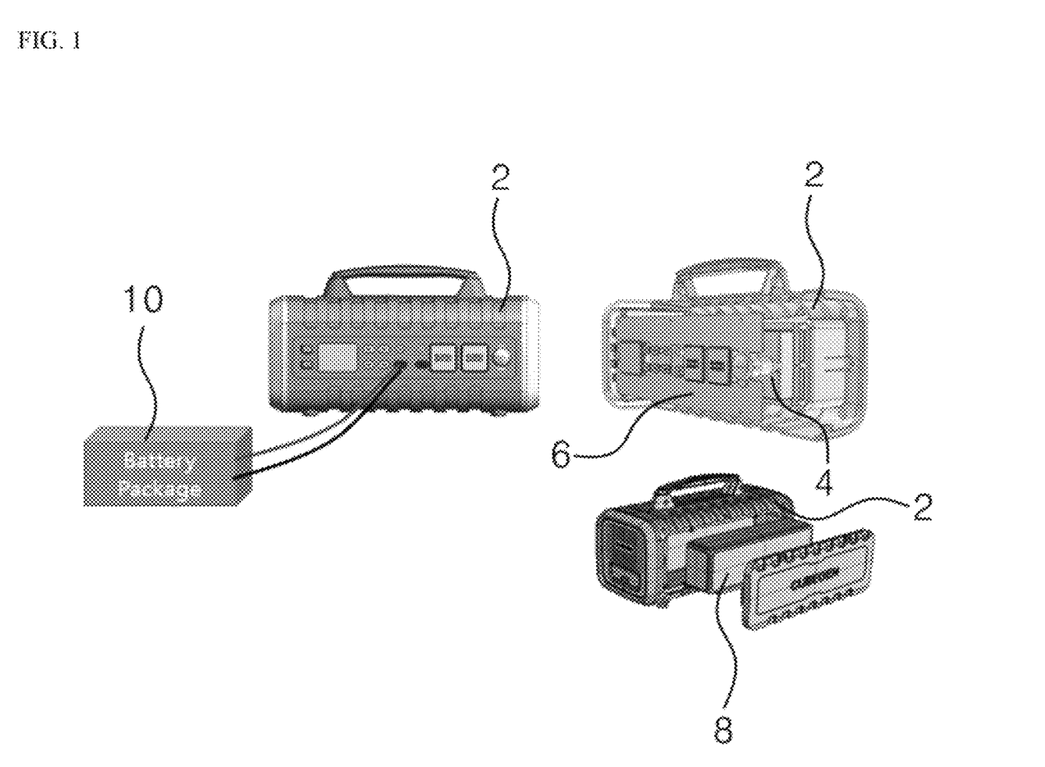
FIG. 1 is a conceptual diagram showing a general energy storage device.

FIG. 1 is a conceptual diagram showing a general energy storage device.

An energy storage device of the present disclosure includes: a casing 2; an inverter provided in the casing 2; a control board 6 controlling overall operation and power of the energy storage device; an internal battery 8 provided in the casing 2; and an external battery 10 connected to the internal battery 8 in parallel outside the casing 2.

Hereinafter, an output control method of the energy storage device configured as described above will be described.

Figure 2:
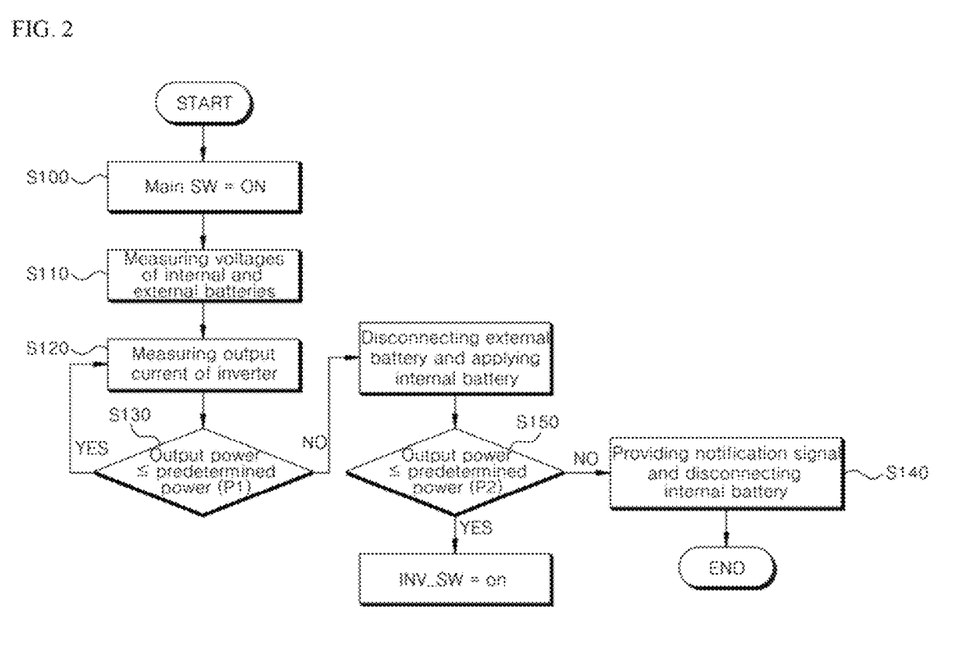
FIG. 2 is a flowchart showing an output control method according to a first exemplary embodiment of the present disclosure.

FIG. 2 is a flowchart showing an output control method according to a first exemplary embodiment of the present disclosure.

According to the first exemplary embodiment, there is provided an output control method of an energy storage device, wherein output of the inverter is limited when the external battery 10 is connected, the output control method including: turning on power of the energy storage device at step S100; detecting connection of the external battery to the inverter by detecting a voltage of the external battery at a detection step S110; measuring a current of the inverter at a current measurement step S120; and comparing an output power of the inverter with a predetermined power P1 at a first power comparison step S130.

First, when the power of the energy storage device is turned on at step S100, the control board 6 detects a voltage of the external battery 10 to detect connection of the external battery 10 to the inverter at the detection step S110.

When connection of the external battery 10 is identified, a current of the inverter is measured at the current measurement step S120.

The output power of the inverter measured at the current measurement step S120 is compared with the predetermined power P1 at the first power comparison step S130.

At the first power comparison step S130, when the output power of the inverter is equal to or less than the predetermined power P1, power of the inverter is turned on and a normal operation starts.

After operation of the inverter starts as a result of the first power comparison step S130, the current measurement step S120 is performed again every predetermined time.

Conversely, at the first power comparison step S130, when the output power of the inverter exceeds the predetermined power P1, connection of the external battery 10 to the inverter is disconnected and the internal battery 8 is applied as a mainly used battery of the inverter.

Afterward, the output power of the inverter is compared with a predetermined power P2 at a second power comparison step S150.

At the second power comparison step S150, when the output power of the inverter is equal to or less than the predetermined power P2, power of the inverter is turned on and a normal operation starts.

After operation of the inverter starts as a result of the second power comparison step S150, the current measurement step S120 is performed again every predetermined time.

At the second power comparison step S150, when the output power of the inverter exceeds the predetermined power P2, connection of the internal battery 8 to the inverter is disconnected and regarding a corresponding situation, a notification signal is provided to the user.

As values applied to the predetermined power P1 and the predetermined power P2 according to manufacturer's intention, preferably, the predetermined power P1 is 500 W and the predetermined power P2 is 1000 W.

Figure 3:
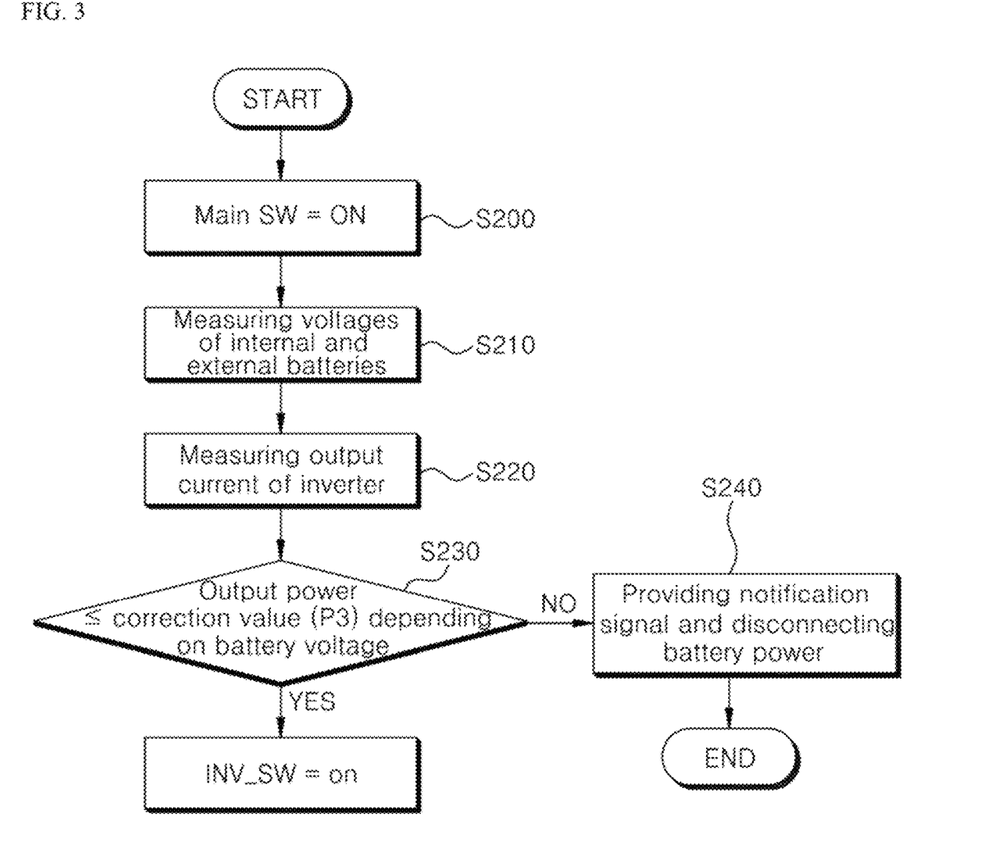
FIG. 3 is a flowchart showing an output control method according to a second exemplary embodiment of the present disclosure.

FIG. 3 is a flowchart showing an output control method according to a second exemplary embodiment of the present disclosure.

According to the second exemplary embodiment, there is provided an output control method of an energy storage device, wherein voltages of the internal battery 8 and the external battery 10 are monitored and when the voltages are equal to or less than a predetermined voltage, output of a predetermined power or more is limited so that durability and life of the internal battery 8 and the external battery 10 are protected, the output control method including: turning on power of the energy storage device at step S200; detecting connection of the external battery to the inverter by detecting a voltage of the external battery 10 at a detection step S210; measuring the voltage of the external battery 10 at a voltage measurement step; measuring a current of the inverter at a current measurement step S220; and comparing an output power of the inverter with a reference correction value P3 at a correction value comparison step S230, the reference correction value P3 depending on the voltage of the external battery 10.

First, when the power of the energy storage device is turned on at step S200, the control board detects a voltage of the external battery 10 to detect connection of the external battery 10 to the inverter at the detection step S210.

When connection of the external battery 10 is identified, a current of the inverter is measured at the current measurement step S220.

The output power of the inverter measured at the current measurement step S220 is compared with the reference correction value P3 at the correction value comparison step S230.

Figure 4:
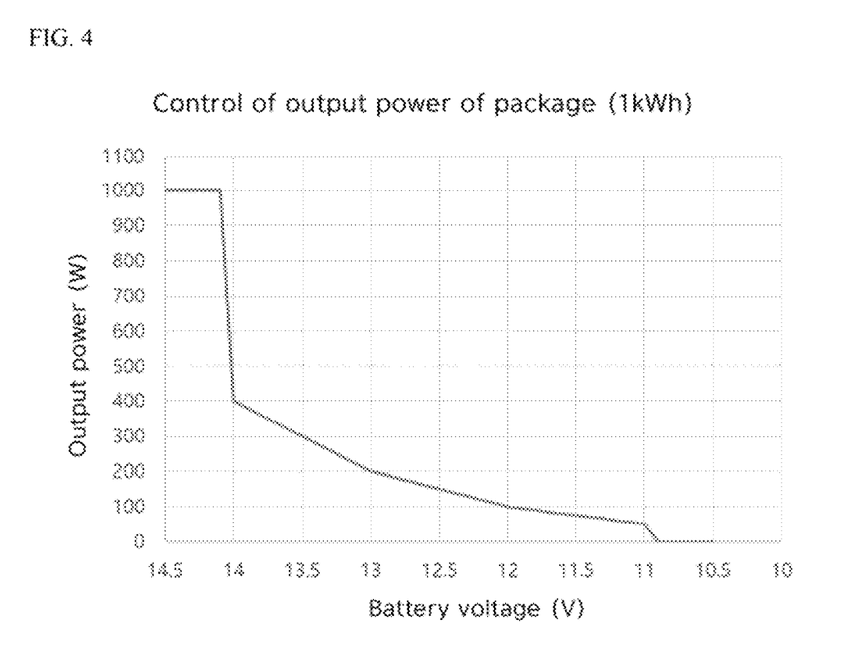
FIG. 4 is a graph showing a correction value of FIG. 3.

FIG. 4 is a graph showing a correction value of FIG. 3.

The reference correction value P3 is a value acquired referring to the graph of FIG. 4. As shown in FIG. 4, when the voltage of the internal battery 8 and the voltage of the external battery 10 are 14 V, the reference correction value P3 is 400 W. When the voltage of the internal battery 8 and the voltage of the external battery 10 are 12 V, the reference correction value P3 is 100 W.

As described above, the reference correction value P3 varies depending on the voltage of the internal battery 8 and the voltage of the external battery 10 measured at the voltage measurement step.

At the correction value comparison step S230, when the output power of the inverter is equal to or less than the reference correction value P3, power of the inverter is turned on and a normal operation starts.

After operation of the inverter starts as a result of the correction value comparison step S230, the voltage measurement step is performed again every predetermined time.

Conversely, at the correction value comparison step S230, when the output power of the inverter exceeds the reference correction value P3, connection of the external battery 10 to the inverter is disconnected and regarding a corresponding situation, a notification signal is provided to the user at step S240.

Figure 5:
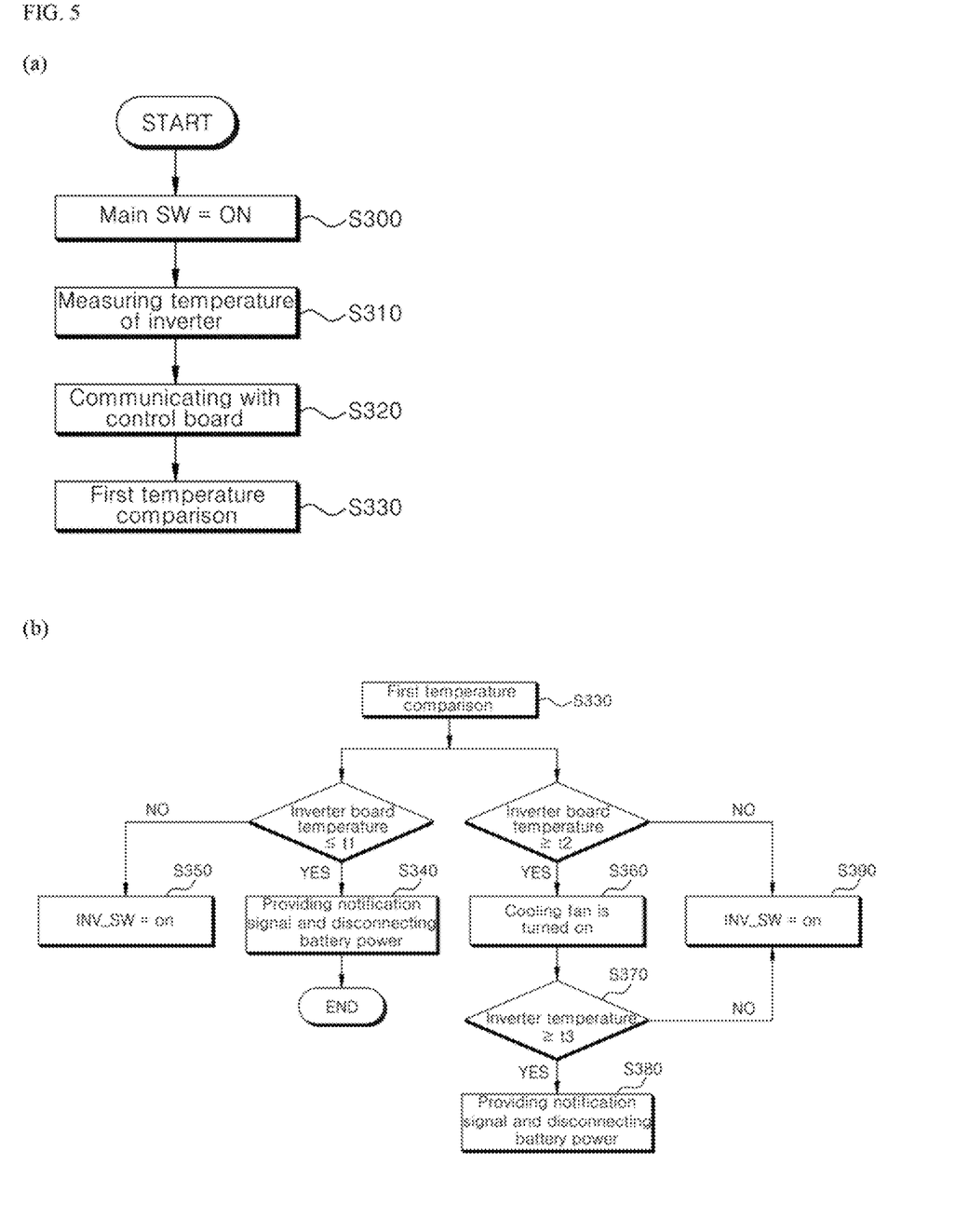
FIG. 5 is a flowchart showing an output control method according to a third exemplary embodiment of the present disclosure.

FIG. 5 is a flowchart showing an output control method according to a third exemplary embodiment of the present disclosure.

According to the third exemplary embodiment, there is provided an output control method of an energy storage device, wherein when a temperature of an inverter board 4 embedded in the inverter is equal to or less than or is equal to or greater than a predetermined temperature, a corresponding state is transmitted to a control board 6 of the energy storage device so that the inverter is prevented from operating in overheating and freezing states, the output control method including: turning on power of the energy storage device at step S300; measuring the temperature of the inverter board 4 at a first temperature measurement step S310, the inverter board 4 being provided inside the inverter and controlling operation and power of the inverter; transmitting the temperature of the inverter board 4 to the control board 6 of the energy storage device at a first communication step S320; and comparing the temperature of the inverter board 4 with a first reference temperature t1 and with a second reference temperature t2 that is higher than the first reference temperature at a first temperature comparison step S330.

First, when the power of the energy storage device is turned on at step S300, a temperature of the inverter board 4 is measured at the first temperature measurement step S310.

The temperature of the inverter board 4 measured at the first temperature measurement step S310 is transmitted to the control board 6.

The temperature of the inverter board 4 is compared with the first reference temperature t1 and the second reference temperature t2 at the first temperature comparison step S330.

As values applied to the first reference temperature t1 and the second reference temperature t2 according to manufacturer's intention, preferably, the first reference temperature t1 ranges from −10° C.~0° C. and the second reference temperature t2 ranges from 60° C.~70° C.

At the first temperature comparison step S330, when the temperature of the inverter board 4 exceeds the first reference temperature t1, the power of the inverter is turned on and a normal operation starts at step S350.

Conversely, at the first temperature comparison step S330, when the temperature of the inverter board 4 is equal to or less than the first reference temperature t1, connection of the internal battery 8 and of the external battery 10 to the inverter is disconnected and regarding a corresponding situation, a notification signal is provided to the user at step S340.

At the first temperature comparison step S330, when the temperature of the inverter board 4 is less than the second reference temperature t2, the power of the inverter is turned on and a normal operation starts at step S390.

After operation of the inverter starts as a result of the first temperature comparison step S330, the first temperature measurement step is performed again every predetermined time.

Conversely, at the first temperature comparison step S330, when the temperature of the inverter is equal to or greater than the second reference temperature t2, a cooling fan for cooling the inverter board 4 is operated at a cooling fan operation step S360.

After the cooling fan operation step S360, the method further includes the following: measuring a temperature of the inverter board 4 at a second temperature measurement step; transmitting the temperature of the inverter board 4 to the control board 6 at a second communication step; and comparing the temperature of the inverter board 4 with a third reference temperature t3 at a second temperature comparison step S370.

At the second temperature comparison step S370, when the temperature of the inverter board 4 is equal to or greater than the third reference temperature t3, connection of the internal battery 8 and of the external battery 10 to the inverter is disconnected and regarding a corresponding situation, a notification signal is provided to the user at step S380.

Conversely, at the second temperature comparison step S370, when the temperature of the inverter board 4 is less than the third reference temperature t3, power of the inverter is turned on and a normal operation starts at step S390.

After operation of the inverter starts as a result of the second temperature comparison step S370, the method further includes the following: measuring a temperature of the inverter board 4 at a third temperature measurement step; transmitting the temperature of the inverter board 4 to the control board 6 at a third communication step; and comparing the temperature of the inverter board 4 with the second reference temperature t2 at a third temperature comparison step.

At the third temperature comparison step, when the temperature of the inverter board 4 is less then the second reference temperature t2, the cooling fan operation step S360 ends.

Conversely, at the third temperature comparison step, when the temperature of the inverter board 4 is equal to or greater than the second reference temperature t2, the cooling fan operation step S360 continues.

In the meantime, after operation of the inverter starts as a result of the second temperature comparison step S370, the first temperature measurement step S310 is performed again every predetermined time.

Figure 6:
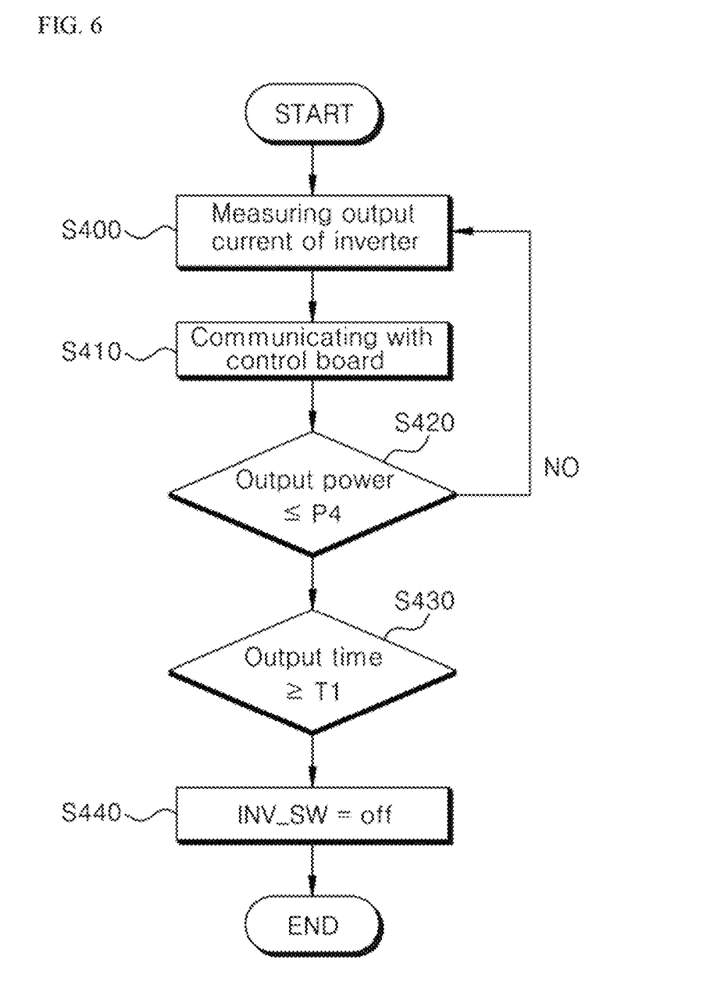
FIG. 6 is a flowchart showing an output control method according to a fourth exemplary embodiment of the present disclosure.

FIG. 6 is a flowchart showing an output control method according to a fourth exemplary embodiment of the present disclosure.

According to the fourth exemplary embodiment, there is provided an output control method of an energy storage device, wherein when output of the inverter is not produced for a predetermined time or longer, a corresponding state is transmitted to the control board 6 so that a power-saving mode is entered and output is disconnected through the control board 6, the output control method including: turning on power of the energy storage device; detecting connection of the external battery 10 to the inverter by detecting a voltage of the external battery 10 at a detection step; measuring the voltage of the external battery 10 at a voltage measurement step; measuring a current of the inverter at a current measurement step S400; transmitting the current of the inverter to a control board of the energy storage device at a first signal transmission step S410; and comparing an output power of the inverter with a predetermined power P4 at a power comparison step S420.

First, when the power of the energy storage device is turned on, the control board 6 detects a voltage of the external battery 10 to detect connection of the external battery 10 to the inverter at the detection step.

When connection of the external battery is identified, a current of the inverter is measured at the current measurement step S400.

The current of the inverter measured at the current measurement step S400 is transmitted to the control board at step S410, and an output power of the inverter is compared with the predetermined power P4 at the power comparison step S420.

At the power comparison step S420, when the output power of the inverter is equal to or less than the predetermined power P4, an output time of the inverter, specifically, the time from the last output of the inverter until now, is compared with a predetermined time T1 at a time comparison step S430.

At the time comparison step S430, when the output time of the inverter is equal to or longer than the predetermined time T1, corresponding information is transmitted to the control board of the energy storage device at a second signal transmission step; the control board controls the inverter such that the inverter enters the power-saving mode; and power of the inverter is disconnected at a power disconnection step.

That is, when the time from the last output of the inverter until now is equal to or longer than the predetermined time T1, the second signal transmission step is performed. Accordingly, the control board controls the inverter such that the inverter enters the power-saving mode, and disconnects the power of the inverter at step S440.

The controlling of the inverter such that the inverter enters the power-saving mode, and the power disconnection step may be performed simultaneously or sequentially, or only one thereof may be performed.

At the time comparison step S430, when the output time of the inverter is shorter than the predetermined time T1, the power comparison step S420 is performed.

In the meantime, at the power comparison step S420, when the output power of the inverter exceeds the predetermined power P4, the current measurement step S400 at which a current of the inverter is measured is performed again.

The first exemplary embodiment to the fourth exemplary embodiment may be performed simultaneously or sequentially after the power of the energy storage device is turned on.

When the first exemplary embodiment to the fourth exemplary embodiment are performed sequentially, the performing order is not limited.

The term "output power" in the present disclosure may be understood as having the same meaning as "rated output".

Although the present disclosure has been described with reference to the exemplary embodiments, those skilled in the art will appreciate that various modifications and variations can be made in the present disclosure without departing from the idea and the technical scope of the disclosure described in the appended claims.

What is claimed is:

1. An output control method of a parallel battery energy storage device including an inverter, wherein the device includes a casing, the inverter provided in the casing, an internal battery provided in the casing, and an external battery connected to the internal battery in parallel outside the casing, the output control method comprising:
turning on power of the energy storage device;
detecting connection of the external battery to the inverter by detecting a voltage of the external battery at a detection step;
measuring a current of the inverter at a current measurement step; and
comparing an output power of the inverter with a predetermined power P1 at a first power comparison step,
wherein at the first power comparison step, when the output power of the inverter exceeds the predetermined power, connection of the external battery is disconnected and the internal battery is applied as a mainly used battery, and
wherein at the first power comparison step, when the output power of the inverter is equal to or less than the predetermined power, power of the inverter is turned on.

2. The output control method of claim 1, further comprising:
after connection of the external battery is disconnected and the internal battery is applied as the mainly used battery, comparing the output power of the inverter with a predetermined power P2 at a second power comparison step.

3. The output control method of claim 2, wherein at the second power comparison step, when the output power of the inverter exceeds the predetermined power P2, connection of the internal battery is disconnected and a notification signal is provided to a user.

4. The output control method of claim 2, wherein at the second power comparison step, when the output power of the inverter is equal to or less than the predetermined power P2, power of the inverter is turned on.

* * * * *